(12) United States Patent  
Du et al.

(10) Patent No.: US 11,953,709 B2  
(45) Date of Patent: Apr. 9, 2024

(54) OPTICAL CAMOUFLAGE FILTER

(71) Applicant: 3M INNOVATIVE PROPERTIES COMPANY, St. Paul, MN (US)

(72) Inventors: Guanglei Du, Woodbury, MN (US); John A. Wheatley, Lake Elmo, MN (US); William B. Kolb, Stillwater, MN (US); John C. Schultz, Afton, MN (US); Daoyun Song, Woodbury, MN (US); Luke D. Riveness, Hastings, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 310 days.

(21) Appl. No.: 17/527,837

(22) Filed: Nov. 16, 2021

(65) Prior Publication Data

US 2022/0075107 A1     Mar. 10, 2022

Related U.S. Application Data

(63) Continuation of application No. 16/071,573, filed as application No. PCT/US2017/014031 on Jan. 19, 2017, now Pat. No. 11,204,456.

(Continued)

(51) Int. Cl.  
     *G02B 5/26*          (2006.01)  
     *G02B 5/20*          (2006.01)  
(Continued)

(52) U.S. Cl.  
CPC ............... *G02B 5/26* (2013.01); *G02B 5/206* (2013.01); *G02B 5/208* (2013.01); *G02B 5/22* (2013.01); *G02B 5/223* (2013.01); *G02B 5/281* (2013.01)

(58) Field of Classification Search  
None  
See application file for complete search history.

(56) References Cited

U.S. PATENT DOCUMENTS

| 5,782,995 A | 7/1998 | Nanya |
| 6,057,961 A | 5/2000 | Allen |

(Continued)

FOREIGN PATENT DOCUMENTS

| CN | 103261927 | 8/2013 |
| CN | 103930806 | 7/2014 |

(Continued)

OTHER PUBLICATIONS

Color IR Transmissive Film, High Performance Laser Mirrors & Optical Filters, Tokai Optical Co., Ltd, 2014, pp. 14-15.

(Continued)

*Primary Examiner* — Derek S. Chapel  
(74) *Attorney, Agent, or Firm* — Clifton F. Richardson

(57) ABSTRACT

A system may include one or both of a light emitter and a light receiver. The system may include an optical filter adjacent one or both of the light emitter or the light receiver. The optical filter includes a wavelength selective scattering layer. The wavelength selective scattering layer may have a near-infrared scattering ratio of less than about 0.9. The filter may have a visible reflective haze ratio of greater than about 0.5. A method may include disposing the wavelength selective scattering layer adjacent one or both of the light emitter and the light receiver. An article may include the optical filter. The wavelength selective scattering layer may have an average near-infrared scattering of less than 60%, an average visible scattering of greater than 10%, and a difference between the % total visible reflectance and the % diffuse visible reflectance of less than 20.

17 Claims, 13 Drawing Sheets

Related U.S. Application Data

(60) Provisional application No. 62/281,643, filed on Jan. 21, 2016.

(51) Int. Cl.
  *G02B 5/22* (2006.01)
  *G02B 5/28* (2006.01)

(56) References Cited

U.S. PATENT DOCUMENTS

| | | | |
|---|---|---|---|
| 6,208,466 | B1 | 3/2001 | Liu |
| 6,818,881 | B1 | 11/2004 | Chernichovski |
| 7,075,056 | B2 | 7/2006 | Harada |
| 7,903,194 | B2 | 3/2011 | Epstein |
| 8,779,349 | B2 | 7/2014 | West |
| 8,787,006 | B2 | 7/2014 | Golko |
| 8,974,905 | B2 | 3/2015 | Sang et al. |
| 11,204,456 | B2 * | 12/2021 | Du .......................... G02B 5/281 |
| 11,269,121 | B2 * | 3/2022 | Du .......................... G02B 5/26 |
| 2002/0041968 | A1 | 4/2002 | Sada |
| 2006/0003239 | A1 | 1/2006 | Cooper |
| 2006/0274218 | A1 | 12/2006 | Xue |
| 2008/0316594 | A1 | 12/2008 | Hashiguchi et al. |
| 2009/0040778 | A1 | 2/2009 | Takayanagi |
| 2009/0200384 | A1 | 8/2009 | Masalkar |
| 2012/0038990 | A1 | 2/2012 | Hao |
| 2012/0179011 | A1 | 7/2012 | Moon |
| 2013/0083142 | A1 | 4/2013 | Minamikawa et al. |
| 2014/0029108 | A1 | 1/2014 | Bockmeyer et al. |
| 2014/0182676 | A1 | 7/2014 | Rosenberg et al. |
| 2014/0213863 | A1 | 7/2014 | Loseu |
| 2014/0264202 | A1 | 9/2014 | Nagaya et al. |
| 2014/0300857 | A1 | 10/2014 | Cohen-Tannoudji et al. |
| 2014/0326292 | A1 | 11/2014 | Yordem |
| 2015/0015978 | A1 | 1/2015 | Konno |
| 2015/0029487 | A1 | 1/2015 | Nakajima |
| 2015/0057511 | A1 | 2/2015 | Basu |
| 2015/0146316 | A1 | 5/2015 | Parker |
| 2015/0192717 | A1 | 7/2015 | Katagiri |
| 2015/0347843 | A1 | 12/2015 | Min |
| 2016/0188576 | A1 | 1/2016 | Yamamoto et al. |
| 2016/0064577 | A1 | 3/2016 | Ballif |
| 2016/0077361 | A1 | 3/2016 | Wold et al. |
| 2017/0087927 | A1 | 3/2017 | Inamoto et al. |
| 2017/0123122 | A1 | 5/2017 | Ballif et al. |
| 2019/0025481 | A1 | 1/2019 | Du |
| 2019/0033502 | A1 | 1/2019 | Du et al. |
| 2019/0339432 | A1 | 11/2019 | Du |
| 2021/0080632 | A1 | 3/2021 | Sharma |
| 2022/0146725 | A1 * | 5/2022 | Du .......................... G02F 1/21 |

FOREIGN PATENT DOCUMENTS

| | | |
|---|---|---|
| CN | 104999749 | 10/2015 |
| CN | 105122453 | 8/2018 |
| JP | H4-43303 | 2/1992 |
| JP | 2002-359491 | 12/2002 |
| JP | 2004-125822 | 4/2004 |
| JP | 2005-092196 | 4/2005 |
| JP | 4122010 B2 | 7/2008 |
| JP | 2010-072616 | 4/2010 |
| JP | 2012-089593 | 5/2012 |
| JP | 2003-017716 | 1/2013 |
| JP | 2013-65052 | 4/2013 |
| JP | 2014-021430 | 2/2014 |
| JP | 2015-110691 | 6/2015 |
| KR | 10-2000-0016930 | 9/2000 |
| WO | 2011050228 A2 | 4/2011 |
| WO | WO 2014/050806 | 4/2014 |
| WO | WO 2014-170323 | 10/2014 |
| WO | WO 2015-081299 | 6/2015 |
| WO | WO 2015/155357 | 10/2015 |
| WO | WO 2017-127483 | 7/2017 |

OTHER PUBLICATIONS

Livedoor News, "DOCOMO Discontinues Production of Popular Models as Inventory Declines, White ROM prices soar as inventory declines." (http://news.livedoor.com/article/detail/10558382/), 2014, 5 pgs.
NITOFLON Fluoroplastic Products/Ultrahigh-Molecular-Weight Polyethylene Products, Nitto Denko Corporation, issued in Oct. 2013, 8 pgs.
Notarized Certificate of Fact Experiment Concerning Preservation of Evidence No. 112 of 2021, Prepared by Notary: Satoshi Ueda, Notary Public, Ikebukuro Notary Public Office; Date of creation: Nov. 16, 2021, 15 pgs.
NTTdocomo F-02G ARROWS NX Instruction Manual '14.10, NTT DOCOMO, Inc, Oct. 2014, pp. 26-27.
NTT DOCOMO homepage, "ARROWS NX F-02G Support Information", NTT DoComo, Inc. (https://www.nttdocomo.co.jp/support/product/f02g/), 2014, 4 pgs. MT.
Report on Analysis/Test Results Measurement of Optical Components, Case No. 185237, UBE Scientific Analysis Center, Inc. report date: Dec. 1, 20210, 19 pgs.
Tokai Kogaku Corporation Home Page, "Corporate History", Tokai Kogaku Co., Nov. 18, 2021, 7 pgs.
Tokai Kogaku's homepage, "Color IR Window/White IR Window", Tokai Kogaku Co., Product information, (https://www.tokaioptical.com/jp/product14/), retrieved from the internet Jun. 2, 2022, 7 pgs.
International Search report for PCT International Application No. PCT/US2017/014031 dated Apr. 27, 2017, 4 pages.
Thorlabs, "Longpass Colored Glass Filters", Thorlab Catalog V21, pp. 816-819 (Year: 2011).
https://www.tokaioptical.com/product/tokai_color_white_ir_window.pdf, Be Artistic, Color and White IR Transmission Film.
Refractive Index.info, "Refractive index of (C16H 14O3)n (Polycarbonate, PC)—Zhang", retrieved from the world wide web on Nov. 21, 2020, <https://refractiveindex.info/?shelf=organic&book=polycarbonate&page=Zhang>, Zhang et al. 2020. (Year: 2020).
Refractive Index.info, "Refractive index of In2O3—SnO2 (Indium tin oxide, ITO)—Moerland", retrieved from the world wide web on Nov. 21, 2020, <https://refractiveindex.info/?shelf=other&book= In2O3-SnO2&page= Moerland >, Moerland et al 2016. (Year: 2020).
Refractive Index.info, "Refractive index of Al2O3 (Aluminium sesquioxide, Sapphire, Alumina)—Malitson-o", retrieved from the world wide web on Nov. 21, 2020, <https://refractiveindex.info/?shelf=main&book=Al2O3&page=Malitson-o>, Malitson et al. 1972. (Year: 2020).
Refractive Index.info, "Refractive index of Zr (Zirconium)—Palm", retrieved from the world wide web on Nov. 21, 2020, <https://refractiveindex.info/?shelf=main&book=Zr&page=Palm>, Kevin Palm et al. 2018. (Year: 2020).
Du et al., Optical Camouflage Filters, U.S. Appl. No. 17/583,553, filed Jan. 25, 2022.

* cited by examiner

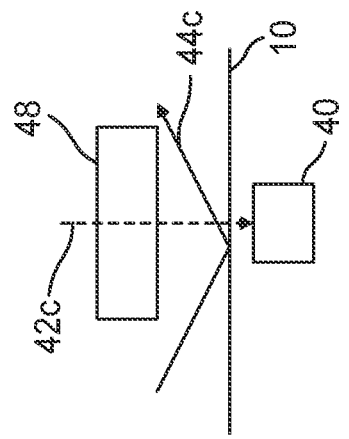
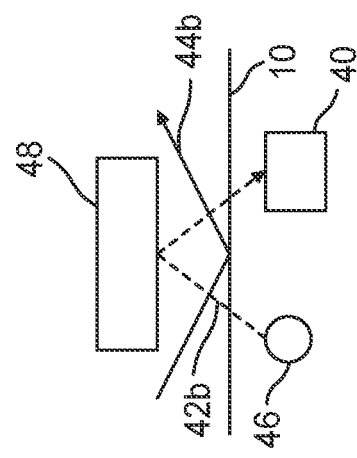
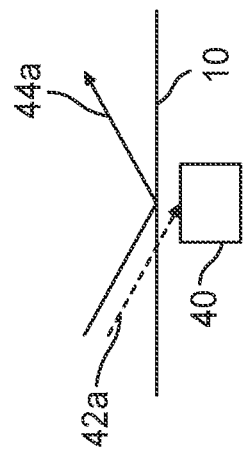
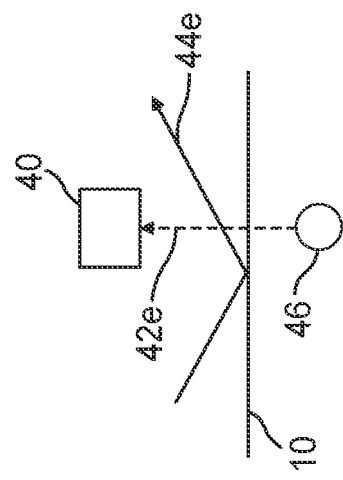

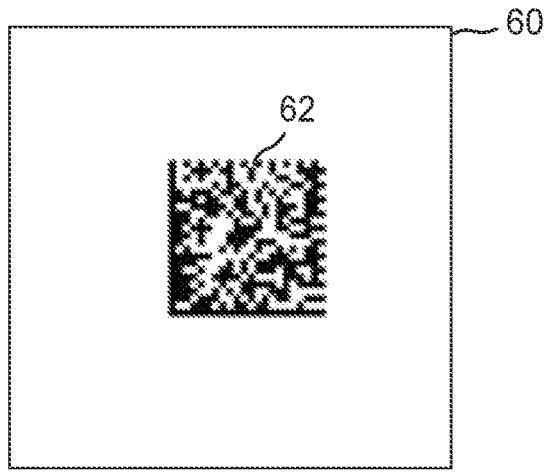
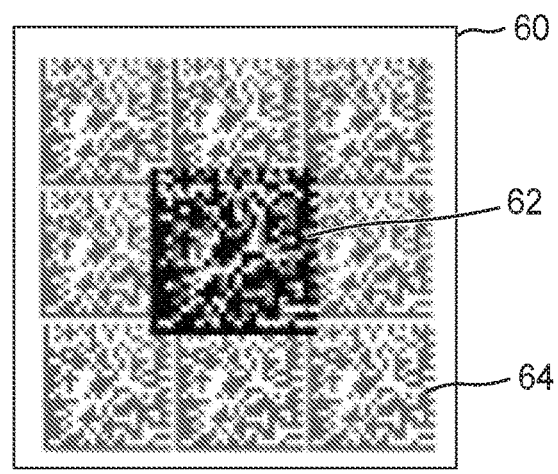
FIG. 3A  FIG. 3B
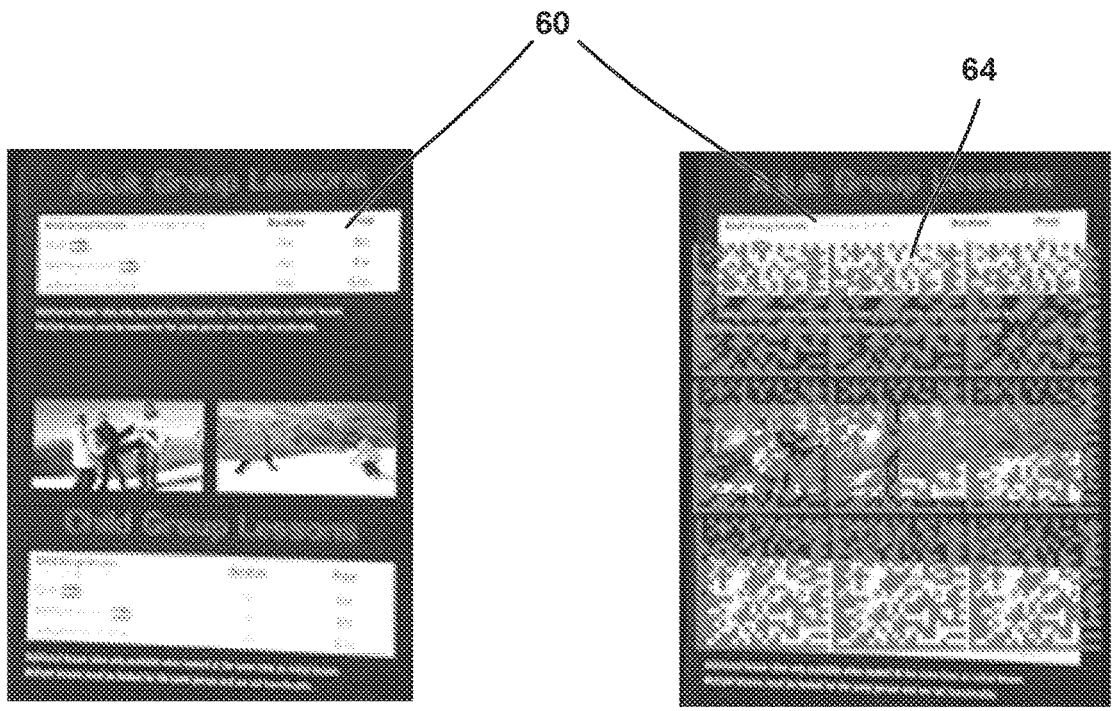
FIG. 3C  FIG. 3D

OPTICAL CAMOUFLAGE FILTER

BACKGROUND

Light may get reflected from surfaces in different ways, for example, as a specular reflection or as a diffusive reflection. In opaque materials, specular reflection may occur on an uppermost surface layer of the material, for example, at an air/material interface, and the reflection may carry a full spectrum of incident light. Specular reflection may manifest as shininess or gloss, which may account for less than 4% of the total reflected light. In contrast, diffusive reflection may occur under a top surface of the material, and may carry selected wavelengths or color. For example, color may be seen in the diffuse reflection of a non-metallic object. Both kinds of reflection may be observed, for example, at hybrid surfaces, for example, surfaces including a paint coat covered by a clear top coat. Thus, specular reflection may occur at the air/top coat interface, while diffuse reflection may occur at the top coat/paint coat interface.

Optical filters are employed in a wide variety of applications such as optical communication systems, sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

SUMMARY

In an example, the disclosure describes an example system that may include one or both of a light emitter or a light receiver. The system may include an optical filter adjacent one or both of the light emitter or the light receiver. The optical filter includes a wavelength selective scattering layer. The wavelength selective scattering layer may have a near-infrared scattering ratio of less than about 0.9. The near-infrared scattering ratio is a ratio of an average near-infrared scattering to an average visible scattering. The wavelength selective scattering layer may have a visible reflective haze ratio of greater than about 0.5. The visible reflective haze ratio is a ratio of an average visible diffusive reflectance to an average visible total reflectance.

In an example, the disclosure describes an example technique that includes disposing an optical filter adjacent one or both of a light emitter or a light receiver. The optical filter includes a wavelength selective scattering layer. The wavelength selective scattering layer may have a near-infrared scattering ratio of less than about 0.9. The wavelength selective scattering layer may have a visible reflective haze ratio of greater than about 0.5.

In an example, the disclosure describes an example article including an optical filter. The optical filter includes a wavelength selective scattering layer. The wavelength selective scattering layer may have a near-infrared scattering ratio of less than about 0.9. The wavelength selective scattering layer may have a visible reflective haze ratio of greater than about 0.5.

In an example, the disclosure describes an example article including an optical filter. The optical filter includes a wavelength selective scattering layer. The wavelength selective scattering layer may have an average near-infrared scattering of less than 60%, an average visible scattering of greater than 10%, and a difference between the % total visible reflectance and the % diffuse visible reflectance of less than 20.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

FIGS. 2A-2E are conceptual and schematic diagrams of example systems including an optical filter.

FIGS. 3A-3D are conceptual diagrams of an example system including an example optical filter and an electronic display displaying a visibly perceptible pattern and an invisible near-infrared pattern.

Figure 1A:
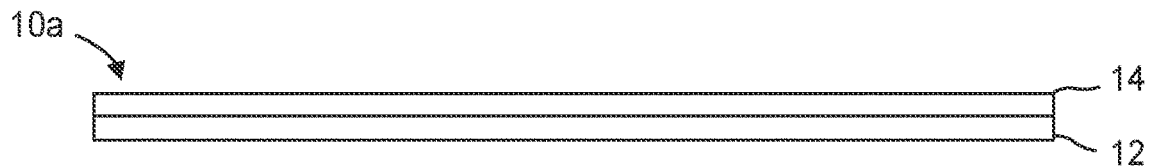
FIGS. 1A-1E are lateral cross-sectional views of example articles including optical filters.

It should be understood that features of certain Figures of this disclosure may not necessarily be drawn to scale, and that the Figures present non-exclusive examples of the techniques disclosed herein.

DETAILED DESCRIPTION

In this disclosure, "visible" refers to wavelengths in a range between about 400 nm and about 700 nm, and "near-infrared" refers to wavelengths in a range between about 700 nm and about 2000 nm, for example, wavelengths in a range between about 800 nm and about 1200 nm. ULI (ultra-low index) films refers to optical films including a binder, a plurality of particles, and a plurality of interconnected voids, as described in U.S. Patent Application Publication No. 2012/0038990, incorporated herein in its entirety by reference.

Ambient sources of electromagnetic radiation may interfere with receivers configured to receive light of particular wavelengths or from particular sources, or with light emitters configured to emit light of particular wavelengths. For example, visible wavelengths may interfere with receiving, sensing, or transmitting near-infrared wavelengths, for example, by increasing noise in a light receiver or in a light emitter. Sources of electromagnetic radiation may also be unintentionally revealed. For example, while light emitted by a light emitter configured to emit only near-infrared wavelengths may not be visibly perceptible, the device or the structure responsible for emitting the light, for example, a housing of the light emitter, may be visibly perceptible. Masking, concealing or otherwise camouflaging the light emitter may present challenges because the camouflage techniques may undesirably result in blocking, interference, or reduction in the transmission of desired near-infrared wavelengths. Optical filters according to examples of this disclosure may be used to prevent unwanted optical interference from visible wavelengths, or to camouflage sources of electromagnetic radiation from visible perception, while at least partially allowing desired near-infrared wavelengths to be transmitted by a light emitter or received by a light receiver, or while allowing transmission of near-infrared wavelengths with relatively high clarity.

For example, a light receiver operating to receive or sense near-infrared wavelengths may be shielded from visible wavelengths, preventing interference with the receiving or sensing of near-infrared wavelengths that may be caused by visible wavelengths. A light transmitter operating to transmit near-infrared wavelengths may be camouflaged against visible perception by scattering visible wavelengths. For example, the scattered visible wavelengths may conceal the presence of the light transmitter, without obstructing the transmission of near-infrared wavelengths.

The amount of specular reflection off a surface may be determined by Fresnel reflection of air interface. For an opaque surface with a clear top layer, it may be assumed that all specular reflection arises from the top air interface, and that the rest of the reflection is diffusive reflection from a bottom layer. An opaque colored material could also follow similar model, while using its refractive index to calculate Fresnel reflection on top surface and treat all other reflection is diffusive. The example optical filters may have a diffusive coating disposed on a clear substrate or a reflective film. When the diffusive coating is coated on clear substrate, it may have a higher haze to hide the items underneath. When the coating is coated on a reflector, the coating will diffuse incident light twice, by reflection. In that case, the coating may have less haze.

Thus example systems may include one or both of a light receiver and a light emitter, and an optical filter that includes a wavelength selective scattering layer that may at least partially reduce the transmission of visible wavelengths, while at least partially allowing the transmission of near-infrared wavelengths. For example, the wavelength selective scattering layer may scatter a majority of incident visible light. Example systems and articles according to the present disclosure may include example optical articles including example wavelength selective scattering layers that transmit near-infrared light with relatively high clarity while reducing the transmission of visible wavelengths, for example, by selectively scattering or reflecting visible wavelengths.

FIGS. 1A-1E are lateral cross-sectional views of example articles including optical filters. FIG. 1A shows a lateral cross-sectional view of example article 10a. Article 10a includes a substrate 12 and a wavelength selective scattering layer 14. The substrate 12 may include glass, polymer, metal, or any other suitable rigid, semi-rigid, or soft maters, and combinations thereof. While the substrate 12 is shown as a layer in the example article 10a of FIG. 1A, in examples, substrate 12 may assume any suitable three dimensional shape that may have a flat, a substantially flat, or a textured surface. In examples, substrate 12 may include a housing, a screen, or a surface of a device, for example, an electronic device.

The wavelength selective scattering layer 14 selective scatters visible light and transmits near-infrared light. In examples, the wavelength selective scattering layer may have a near-infrared scattering ratio of less than about 0.9, less than about 0.8, less than about 0.7, less than about 0.6, or less than about 0.5. The near-infrared scattering ratio is a ratio of an average near-infrared scattering to an average visible scattering. In examples, the wavelength selective scattering layer 14 may have a visible reflective haze ratio of greater than about 0.5, or greater than about 0.7, or greater than about 0.9. The visible reflective haze ratio is a ratio of an average visible diffusive reflectance to an average visible total reflectance. In examples, the wavelength selective scattering layer 14 may transmit less than about 50% of incident visible light. In examples, the wavelength selective scattering layer 14 may transmit greater than about 50% of incident near-infrared light. In examples, the wavelength selective scattering layer 14 may transmit less than about 50% of incident visible light, and transmit greater than about 50% of incident near-infrared light. In examples, the wavelength selective scattering layer 14 may scatter greater than about 50% of incident visible light. For example, the wavelength selective scattering layer 14 may transmit less than about 50% of incident visible light by scattering more than about 50% of incident visible light. In examples, the wavelength selective layer 14 may scatter greater than about 50% of incident visible light as white light.

The wavelength selective scattering layer 14 may include a medium and a plurality of particles with respective predetermined refractive indices. In examples, the wavelength selective scattering layer 14 may include a beaded diffuser layer. For example, the wavelength selective scattering layer 14 may include a medium and beads dispersed in the medium. The medium of the beaded diffuser layer may include glass, polymer, or any other suitable optical medium, or combinations thereof. The beads may include silica, glass, polymeric, organic, inorganic, metal oxide, polystyrene, or other suitable scattering materials, or combinations thereof. The diffuser layer may include pores including a gas such as air. In examples, the pores including gas may be encapsulated in beads.

The wavelength selective scattering layer 14 may include an optical medium have a first refractive index. The optical medium may include a plurality of particles. The plurality of particles may have a second refractive index such that an absolute difference between the first refractive index and the second refractive index is less than about 0.1. In examples, the plurality of particles may have an average particle size of less than about 5 μm, and the absolute difference between the first and second refractive indices may be less than about 0.1. In examples, the plurality of particles may have an average particle size of less than about 1 μm, and the absolute difference between the first and second refractive indices may be less than about 0.2. In examples, the plurality of particles may have an average particle size of less than about 0.5 μm, and the absolute difference between the first and second refractive indices may be less than about 0.4. In examples, the plurality of particles may have an average particle size of less than about 0.3 μm, and the absolute difference between the first and second refractive indices may be less than about 0.6. In examples, the plurality of particles may have an average particle size of less than about 0.2 μm, and the absolute difference between the first and second refractive indices may be less than about 1.8.

In examples, an average particle size of the plurality of particles, the first refractive index, and the second refractive index are selected from a region under line 82 of FIG. 15, described below. Thus, the near-infrared scattering ratio of the wavelength selective scattering layer 14 may be less than 0.2. In examples, an average particle size of the plurality of particles, the first refractive index, and the second refractive index are selected from a region under line 84 of FIG. 15. Thus, the near-infrared scattering ratio of the wavelength selective scattering layer 14 may be less than 0.4. In examples, an average particle size of the plurality of particles, the first refractive index, and the second refractive index are selected from a region under line 86 of FIG. 15. Thus, the near-infrared scattering ratio of the wavelength selective scattering layer 14 may be less than 0.6. In examples, an average particle size of the plurality of particles, the first refractive index, and the second refractive index are selected from a region under line 88 of FIG. 15. Thus, the near-infrared scattering ratio of the wavelength selective scattering layer 14 may be less than 0.8. In examples, the near-infrared scattering ratio of the wavelength selective scattering layer 14 may be less than 0.7, or may be less than 0.5. In examples, the region under respective lines 82, 84, 86, 88 or any other region may be bounded by a lower particle size bound. For example, the region may only include particle sizes above 10 nm, or 30 nm, or 50 nm, or particle sizes greater than particle sizes at which Rayleigh scattering may manifest or predominate.

In examples, the wavelength selective scattering layer 14 may have a total visible reflectance of less than 50%, of at least 50%, or at least 60%, or at least 70%. In examples, the total visible reflectance may be less than 50%, and the wavelength selective scattering layer 14 may conceal objects by visible haze. In examples, the total visible reflectance may be greater than 50%, and the wavelength selective scattering layer 14 may conceal objects by a combination of visible reflection and visible haze. In examples, the wavelength selective scattering layer 14 may have an average near-infrared scattering of less than 60%, or less than 40%. In examples, the wavelength selective scattering layer may have an average visible scattering of greater than 10%, or greater than 25%, or greater than 58%. In examples, a difference between the % total visible reflectance and the % diffuse visible reflectance of the wavelength selective scattering layer 14 may be less than 20. In examples, the wavelength selective scattering layer may have an average near-infrared scattering of less than 40%, and an average visible scattering of greater than 58%, and the difference between the % total visible reflectance and the % diffuse visible reflectance may be less than 18.

In examples, the wavelength selective scattering layer 14 may have a visible haze of at least 15%, or at least 25%, or at least 35%, or at least 50%. In examples, the optical filter 10*a* may include surface optical microstructures, such as microreplicated surface structures.

In examples, the wavelength selective scattering layer 14 may include ULI layer including a binder, a plurality of particles, and a plurality of interconnected voids. A volume fraction of the plurality of interconnected voids in the optical filter may not less than about 20%. A weight ratio of the binder to the plurality of particles may not be less than about 1:2.

Figure 1B:
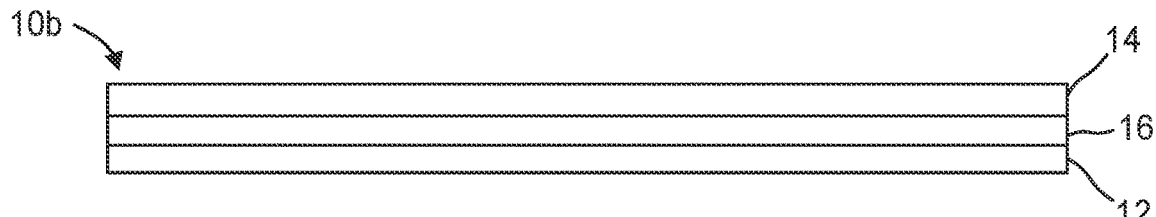

FIG. 1B shows a lateral cross-sectional view of example article 10*b*. Article 10*b* may include the substrate 12, the wavelength selective scattering layer 14, and a reflective layer 16. While reflective layer 16 is shown between the wavelength selective scattering layer 14 and the substrate 12 in article 10*b*, in examples, article 10*b* may not include the substrate 12, and the wavelength selective scattering layer may be disposed on the reflective layer 16. In examples, substrate 12 may include the reflective layer 16, for example, at a major surface or within an interior of substrate 12. In examples, the reflective layer 16 may be disposed below the substrate 12. In examples, the reflective layer 16 may be disposed above the substrate 12. In examples, the reflective layer 16 may be perforated. In examples, article 10*b* may reflect less than 50% of visible light, and transmit more than 50% of near-infrared light. In examples, reflective layer 16 may be wavelength selective, for example, reflecting only selected wavelengths. Reflective layer 16 may include a multilayer optical film, a dichroic reflector, an interference film, an inorganic multilayer stack, a metal dielectric stack, a polished substrate, a mirror, a reflective polarizer, or a reflective surface such as a reflective metal or glass surface. In examples, article 10*b* may include a dye layer (not shown) between the reflective layer and the wavelength selective scattering layer 14, or above the wavelength selective scattering layer 14, or positioned adjacent any layer in article 10*b*. The dye layer may include a spectrally selective dye, that may be transmissive or clear in near-infrared, and neutral in visible, such that it reduces the visible reflection of the reflective layer 16. In examples, the dye layer may have at least 30%, 50%, 70%, or 90% absorption. In examples, the dye layer could be colored, so that it has a visible color, while remaining transmissive in near-infrared.

Figure 1C:
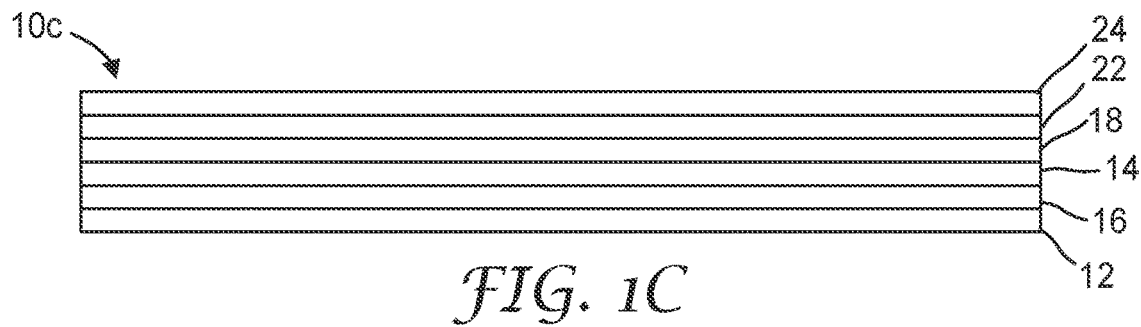

FIG. 1C shows a lateral cross-sectional view of example article 10*c*. Article 10*c* may include the substrate 12 and the wavelength selective scattering layer 14. Article 10*c* may optionally include one or more of the reflective layer 16, an ink receptive layer 18, a printed pattern layer 22, and a protective layer 24, as shown in FIG. 1C. While FIG. 1C shows a particular arrangement for layers in article 10*c*, the respective layers may be rearranged in any suitable configuration. For example, substrate 12 may be omitted when the reflective layer 16 is present. The protective layer 24 may include a sealant layer. In examples, the inked pattern layer 22 includes a printed pattern of ink or pigment that may be deposited on the ink receptive layer 18. In examples, the ink receptive layer may be omitted, and the inked pattern layer 22 may be deposited on the wavelength selective scattering layer 14. In examples, the protective layer 24 may be disposed between the inked pattern layer 22 and the wavelength selective scattering layer 14. In examples, two protective layers 24 may be disposed, one above the inked pattern layer 22, and another adjacent the wavelength selective scattering layer 14.

Figure 1D:
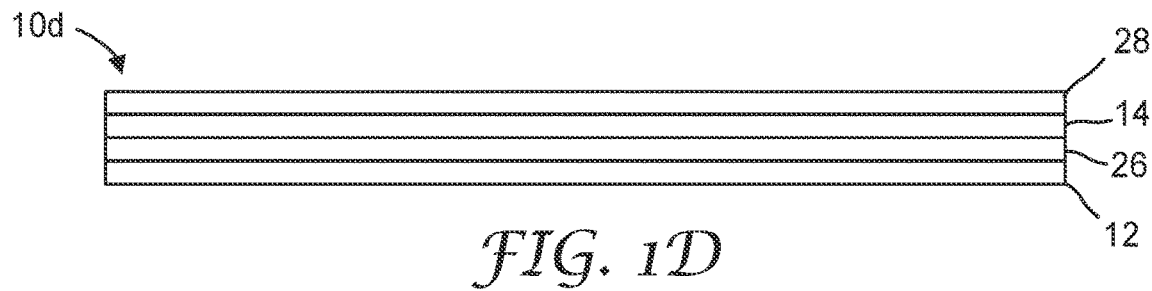

FIG. 1D shows a lateral cross-sectional view of example article 10*d*. Article 10*d* may include the substrate 12, the wavelength selective scattering layer 14, a first sealant layer 26 and a second sealant layer 28. One of both of the first sealant layer 26 and the second sealant layer 28 may include a latex coating. The respective sealant layers, may protecting the integrity of the wavelength selective scattering layer 14, for example, by preventing or reducing the intrusion of moisture or other reactants or disintegrants. The respective sealant layers may also provide structural support and physical stability to the wavelength selective scattering layer 14. For example, one or both of the first sealant layer 26 and the second sealant 28 may allow the wavelength selective scattering layer 14 to be peeled off or removed from a manufacturing substrate and then transported to and applied over a product substrate, for example, over substrate 12.

Figure 1E:
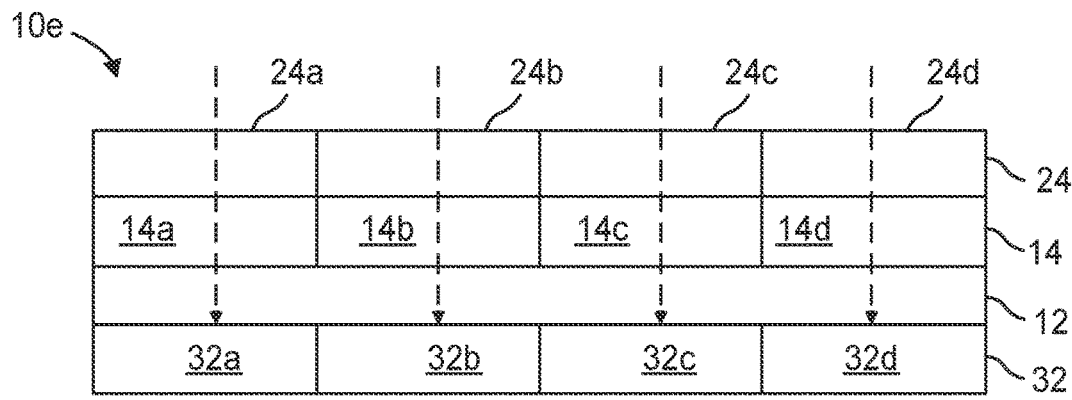

FIG. 1E shows a lateral cross-sectional view of example article 10e. Article 10e may include the substrate 12, the wavelength selective scattering layer 14 adjacent the substrate 12, and an inked pattern layer 24 deposited on the wavelength selective scattering layer 14. A sensor layer 32 including respective sensor segments 32a, 32b, 32c, and 32d may be disposed adjacent the substrate 12. In examples, the substrate 12 may be omitted, and the wavelength selective scattering layer 14 may be deposited on the sensor layer 32. In examples, the wavelength selective scattering layer 14 may include respective selective scattering segments 14a, 14b, 14c, and 14d, that may be aligned with respective sensor segments 32a, 32b, 32c, and 32d. One or more of the selective scattering segments may be omitted, so that the wavelength selective scattering layer 14 may include at least one perforation that may be aligned with at least one of the respective sensor segments. Thus different selective scattering segments may be tuned by changing the near-infrared scattering ratio, the visible haze ratio, or other optical properties that may improve the performance of the sensor segment aligned with the respective selective scattering segment. While four segments are shown in the wavelength scattering layer 14 and the sensor layer 32 of FIG. 1E, in examples, the wavelength scattering layer 14 and the sensor layer 32 may have any suitable number of segments. While sensor layer 32 is described in the example of FIG. 1E, in examples, article 10e may include light sources 32a, 32b, 32c, and 32d instead of sensor segments.

While FIGS. 1A-1E show respective articles 10a-10e as including flat layers, in various examples, articles 10a-10e may assume any suitable shape, periphery, or cross-section, and layers in articles 10a-10e may assume a regular, irregular, or compound curvature, or may assume flat or curved geometries in different regions, or otherwise conform to a contour of a substrate beneath the layers or the articles 10a-10e. For example, articles 10a-10e may assume a hemispherical or lenticular shape.

FIGS. 2A-2E are conceptual and schematic diagrams of example optical systems including an optical filter. FIG. 2A is a conceptual and schematic diagrams of an example optical system including an optical filter 10 and a light receiver 40. In examples, the light receiver 40 may include a light sensor, camera, CCD, or any other sensor configured to sense at least a predetermined wavelength region of light. For example, light receiver 40 may include a near-infrared sensor. In examples, the light receiver 40 may include an object that receives light, for example, a solar cell, or an object that at least partially absorbs incident light, for example, a solar heater or any other object that receives light. The optical filter 10 may include any of the example optical filters including a wavelength selective scattering layer, as discussed above with reference to FIGS. 1A-1E, or other example optical filters described in the disclosure. As shown in FIG. 2A, the optical filter 10 may be disposed adjacent the light receiver 40. An incident near-infrared ray 42a may include a near-infrared wavelength, and may be substantially transmitted through the optical filter 10 to the light receiver 40. An incident visible ray 44a may include a visible wavelength and may be substantially reflected or scattered by the optical filter 10, so that the light receiver 40 is at least partially shielded from the visible ray 44a, while at least partially receiving the near-infrared ray 42a. In examples, the light receiver may be substantially or completely shielded from the visible ray 44a by the optical filter 10, and may receive substantially all of near-infrared ray 42a.

FIG. 2B is a conceptual and schematic diagrams of an example optical system including the optical filter 10, the light receiver 40, a light emitter 46, and an object 48. In examples, the light emitter 46 may include a source of any suitable wavelength of light or electromagnetic radiation, including visible, near-infrared, or ultraviolet wavelengths. In examples, the light emitter 46 may include a bulb, an incandescent light source, compact fluorescent light, LEDs, a light guide, or any natural or artificial sources of light. In examples, the light emitter 46 may not generate light, and may only reflect or transmit light generated by a light source. The optical filter 10 may be disposed between the light receiver 40 and the object 48. The light emitter may be disposed on the same side of the optical filter 10 as the light receiver 40. An near-infrared ray 42b transmitted from the light emitter 46 may include a near-infrared wavelength, and may be substantially transmitted through the optical filter 10 to the object 48. The ray 42b may be reflected back by the object 48, and the reflected ray may be modified by the optical properties of the object 48. The reflected ray 42 may be substantially transmitted through the optical filter 10 to the light receiver 40. An incident visible ray 44b may include a visible wavelength and may be substantially reflected or scattered by the optical filter 10, so that one or both of the light receiver 40 and the light emitter 46 are at least partially shielded from the visible ray 44a. In examples, the light receiver may be substantially or completely shielded from the visible ray 44b by the optical filter 10, and may receive substantially all of near-infrared ray 42b.

FIG. 2C is a conceptual and schematic diagrams of an example optical system including the optical filter 10, the light receiver 40, and the object 48. The optical filter 10 may be disposed between the light receiver 40 and the object 48. An incident near-infrared ray 42c may include a near-infrared wavelength, and may be substantially transmitted through the object 48 and the optical filter 10 to the light receiver 40. An incident visible ray 44c may include a visible wavelength and may be substantially reflected or scattered by the optical filter 10, so that the light receiver 40 is at least partially shielded from the visible ray 44c, while at least partially receiving the near-infrared ray 42c. In examples, the light receiver 40 may be substantially or completely shielded from the visible ray 44c by the optical filter 10, and may receive substantially all of near-infrared ray 42c.

FIG. 2D is a conceptual and schematic diagrams of an example optical system including the optical filter 10 and the light receiver 40. The optical filter 10 may be disposed adjacent the light receiver 40. An incident near-infrared ray 42d may include a near-infrared wavelength, and may be substantially reflected off the optical filter 10 to the light receiver 40. An incident visible ray 44d may include a visible wavelength and may be substantially reflected or scattered by the optical filter 10, so that the light receiver 40 at least partially receives the visible ray 44d, while at least partially receiving the near-infrared ray 42d.

FIG. 2E is a conceptual and schematic diagrams of an example optical system including the optical filter 10, the light receiver 40, and the light emitter 46. The optical filter 10 may be disposed between the light emitter 46 and the light receiver 40. A near-infrared ray 42*e* transmitted from the light emitter 46 may include a near-infrared wavelength, and may be substantially transmitted through the optical filter 10 to the light receiver 40. An incident visible ray 44*e* may include a visible wavelength and may be substantially reflected or scattered by the optical filter 10, so that the light emitter 46 is at least partially shielded from the visible ray 44*e*. In examples, the light emitter 46 may be substantially or completely shielded from the visible ray 44*e* by the optical filter 10. While the light receiver 40 is described in the example optical system of FIG. 2E, in examples, the example optical system of FIG. 2E may not include a light receiver 40. For example, the example optical system may include the light emitter 46 and the optical filter 10, and the optical filter 10 may conceal the light emitter 46 from visible appearance.

In examples, the optical filter 10 may include at least one removable or repositionable layer, or optical filter 10 as a whole may be removable or repositionable, so that it can be removed or repositioned relative to a substrate underneath or adjacent the optical filter 10. In examples, the periphery of the optical filter 10 may extend beyond the periphery of one or both the light emitter 46 or the light receiver 40, or the area of a major surface of the optical filter 10 may be greater or smaller than a surface area of one or both of the light emitter 46 or the light receiver 40. In examples, the optical filter 10 may be configured to camouflage other components, such as electronics, circuitry, substrates, sensors, transmitters by shielding those components by the optical filter from a visual perception. In examples, more than one light emitter 46 or light receiver 40, for example, an array, could be positioned adjacent the optical filter 10. In examples, one or both of the light emitter 46 or the light receiver 40 may be relatively remote from the optical filter 10, for example, at least 1 cm away, or 10 cm away, or 1 m away or, 10 m away, or 100 m away, or 1 km away, or even further remote. While a direct path for light is shown in FIGS. 2A-2E, for example, between one or both of the light emitter 46 and the light receiver 40 and the optical filter 10, in examples, light between one or both of the light emitter 46 and the light receiver 40 and the optical filter 10 may follow indirect paths, including optically guided paths, reflected paths, or paths including optical manipulation including refraction or filtering, or paths that travel through different optical media.

Thus, in examples, the optical filter 10 may be configured to at least partially shield the light receiver 40 from visible wavelengths while substantially allowing the light receiver 40 to receive near-infrared wavelengths. In examples, the optical filter 10 may be configured to camouflage one or both of the light receiver 40 or the light emitter 46 from a visual perception, for example, by scattering visible wavelengths.

FIGS. 3A-3D are conceptual diagrams of an example system including an example optical filter and an electronic display displaying a visibly perceptible pattern and an invisible near-infrared pattern. Since imaging sensors such as charge-coupled devices (CCD) detect in the near-infrared region, it would be possible to produce a sign including a visibly reflective graphic. The sign could conceal an invisible image that is detectable by the camera. For example, the image could include a predetermined pattern that encodes a signal or information, such as a bar code, a 2D bar code, or a QR code. The physical size of QR codes may limit the amount of information they may contain. However an invisible QR code could be physically as large as the sign without cluttering or compromising the visible graphic. In an example, an electronic display 60 may be capable of simultaneously displaying visible and near-infrared patterns emitted by respective visible and near-infrared light emitters concealed behind the display 60. The electronic display 60 may be covered with an example optical filter described above with reference to FIGS. 1A-1E. For example, the electronic display 60 may simultaneously display a pattern 62 that is visible and an invisible near-infrared pattern 64, as shown in FIG. 3B. The pattern 62 may include a relatively smaller QR code or other indicia with a relatively smaller display footprint, while the pattern 64 may include a relatively larger QR code or other indicia with a relatively larger footprint. The pattern 62 may be visible as a result of reflection or scattering of visible wavelengths by the optical filter (not shown). As seen in FIG. 3A, only pattern 62 may be visibly perceived, and pattern 64 may remain invisible to visual perception, while being presented with relatively high clarity in near-infrared wavelengths. A camera capable of sensing near-infrared wavelengths may thus sense pattern 64 with sufficient resolution, for example, with a resolution sufficient to decode information that may be contained in pattern 64. In the example shown in FIG. 3C only a predetermined pattern may be visibly perceptible on display 60, while an invisible near-infrared pattern only detectable by a near-infrared camera may be simultaneously displayed on the display 60, as shown in FIG. 3D. Thus, in the respective example systems of 3A and 3B, and 3C and 3D, an example optical filter may be used to conceal or camouflage a source of a near-infrared pattern while revealing only a predetermined visible pattern. In some examples, the invisible near-infrared patterns 64 may be used to encode concealed information, while the visibly perceptible patterns 62 may be used to present visibly perceptible information, or at least information that may be encoded, but is visibly perceptible as being encoded. For example, pattern 62 may encode a first set of information, such as a website, while pattern 64 may encode a second set of information, such as a location of the display 60. In examples, the electronic display 60 may display a visible pattern, an invisible pattern, or both. In examples, the electronic display 60 may display multiple patterns. In examples, the electronic display may display static patterns or dynamic patterns. Thus, example optical filters may provide camouflage with high clarity near-infrared transmission.

Figure 4:
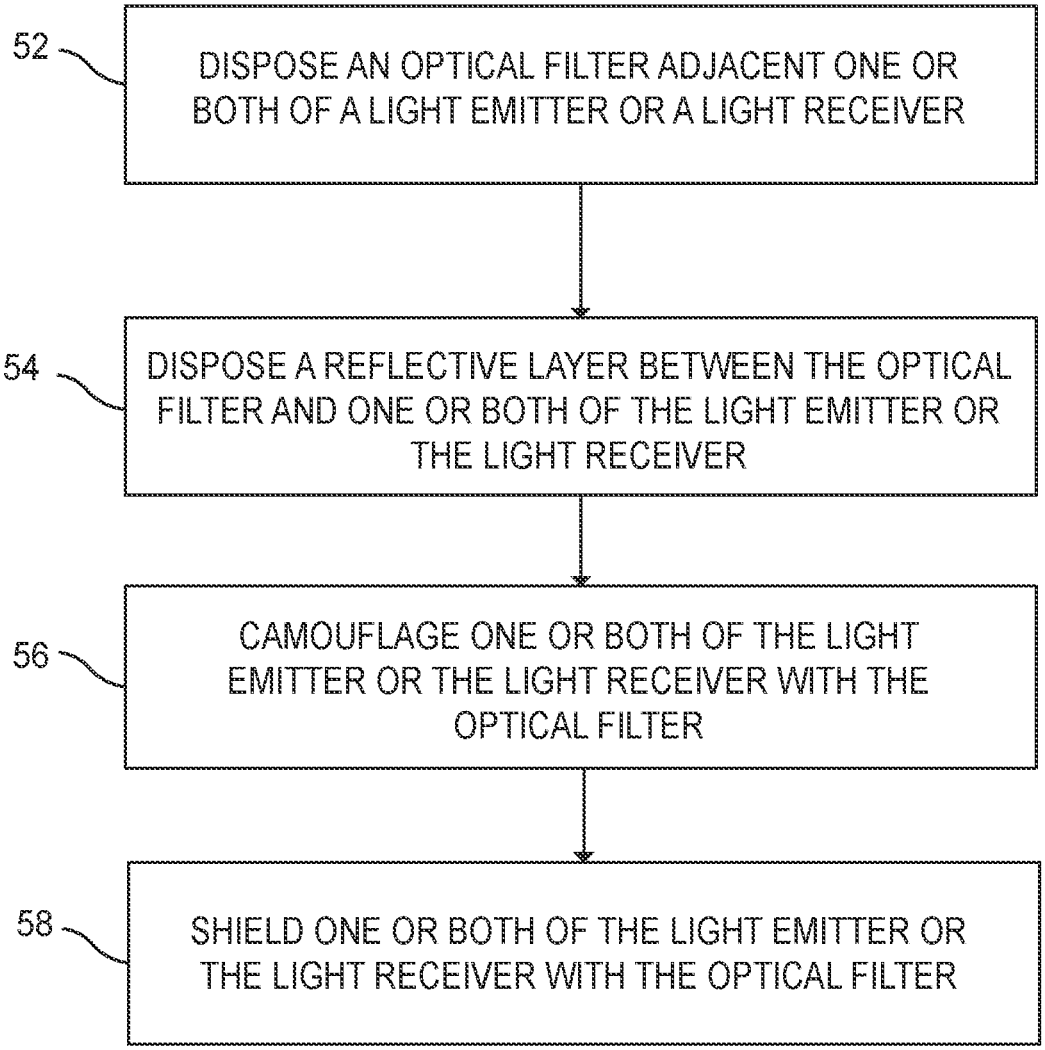
FIG. 4 is a flowchart of an example technique.

FIG. 4 is a flowchart of an example technique. The example technique may include disposing an optical filter 10 adjacent one or both of the light emitter 46 or the light receiver 40 (52). The optical filter 10 includes a wavelength selective scattering layer, as discussed above with reference to FIGS. 1A-1E and FIGS. 2A-2E. The example technique may optionally further include disposing the reflective layer 16 between the optical filter 10 and one or both of the light emitter 46 or the light receiver 40 (54). The optical filter 10 may optionally camouflage one or both of the light emitter 46 or the light receiver 40 (56). The optical filter 10 may optionally at least partially shield one or both of the light emitter or the light receiver from visible wavelengths (58).

Thus, example systems, articles, and techniques according to the present disclosure may include example optical articles including example wavelength selective scattering layers that transmit near-infrared light with relatively high clarity while reducing the transmission of visible wavelengths, for example, by selectively scattering or reflecting visible wavelengths.

Example articles and techniques according to the disclosure provide will be illustrated by the following non-limiting examples.

EXAMPLES

Example 1

Optical properties for various sample optical films were determined. Sample optical films S01 to S34 were prepared as described below. The visible scattering, the near-infrared scattering, total visible reflectance, and diffuse visible reflectance were measured for each of samples S01 to S33, using a spectrometer (Lambda 900, PerkinElmer) with integrating spheres to capture diffuse and specular reflectance. The results are presented in TABLE 1. The presented reflectance values include SPIN (specular included, or total) and SPEX (specular excluded, or diffuse) reflectances. The sensitivity of a proximity sensor covered with the respective sample films was determined, and categorized as one of "Not Working," "Functional," "Good," and "Excellent." The transmittance, haze, and clarity was determined for samples S01 to S34, using a haze meter (Haze-gard Plus, BYK-Gardner). The results are presented in TABLE 2.

Figure 9:
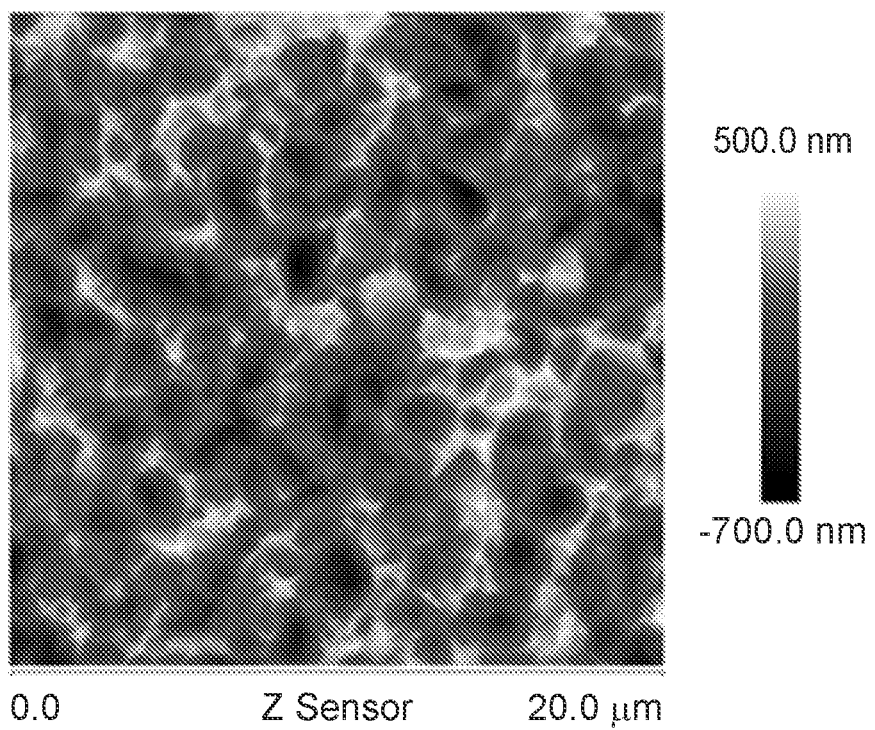
FIG. 9 is an atomic force microscopy (AFM) photograph of a surface of an example optical filter.

Samples S01 to S03 were ULI films, with sample S02 including a high haze high clarity ULI film. Sample S01 was prepared by combining Silquest A-174 75 nm silane particles (Momentive) with pentaerythritol triacrylate monomer (SR444, Sartomer) in a 60% wt ratio, and 2.5% of Irgacure 184 (Ciba Specialty Chemicals Company, High Point N.C.), to arrive at a coating thickness of 10 μm. Sample S04 included a film of $TiO_2$ nanoparticles and silicone microparticles. Sample S04 was prepared by mixing 19.13 g of M1192 (Miwon), 3.38 g of CN9018 (Sartomer), 2.5 g of Tospearl 145 (Momentive), 12.5 g of SR415 (Sartomer), 12.5 g of 42.3 wt % $TiO_2$ (UV-TITAN L-530, Sachtleben) in IBOA, 25 g of methylethylketone, and 0.5 g of photoinitiator TPO-L (BASF), and coating the formulation with a #8 Mayer bar. Sample S05 was a film having a microreplicated surface structure (FIG. 9). Sample S6 included 3 μm polystyrene beads coated on ESR2 film (Enhanced Specular Reflector, 3M) for 10 micron dry thickness, with pentaerythritol triacrylate binder (SR444, Sartomer) and isopropyl alcohol solvent. Sample S07 included a non-woven material (a bottom diffuser disassembled from a Sony TV model 40W600B). Sample S08 included a $TiO_2$ coated PET film, SH2FGST Fasara Film (3M). Samples S09 and S10 are bulk diffusers with different haze values. Sample S09 included PATTCLR0 frosted acrylate sheet (ePlastics, San Diego, CA). Sample S10 included a diffuser plate from a TCL TV (model 40FD2700). Sample S11 was a bottom diffuser sheet from an iPad (first generation, Apple) backlight. Sample S12 included a film of plastic including dispersed $TiO_2$ (plastic 6"×8" pint size seal top food bag with white write-on block, from Elkay Plastics, Bensenville, IL). Sample S13 includes white paper (HAmmermill Copy Plus multipurpose printer paper). Sample S14 includes a film having a microreplicated surface structure (iPhone 6 backlight). Samples S15 to S22 include films of ULI material. Sample S23 includes sample S04 folded over itself. Sample S24 includes sample S03 folded over itself. Sample S25 includes sample S15 folded over itself. Sample S26 includes sample S16 folded over itself. Sample S27 includes sample S17 folded over itself. Sample S28 includes sample S18 folded over itself. Sample S29 includes sample S19 folded over itself. Sample S30 includes sample S20 folded over itself. Sample S31 includes sample S21 folded over itself. Sample S32 includes sample S2 folded over itself. Sample S33 includes sample S22 folded over itself.

TABLE 1

| | Scattering | | | Visible Reflection | | | Sensitivity of |
|---|---|---|---|---|---|---|---|
| | Visible | NIR | | | | | proximity sensor |
| Sample | (400 nm-700 nm) scattering | (800 nm-1200 nm) scattering | Ratio | SPIN (total) | SPEX (diffuse) | Ratio | covered with sample film |
| S01 | 86.01 | 32.19 | 0.37 | 55.51 | 51.60 | 0.93 | Good |
| S02 | 60.62 | 7.96 | 0.13 | 40.47 | 39.85 | 0.98 | Excellent |
| S03 | 24.18 | 4.47 | 0.19 | 24.47 | 21.01 | 0.86 | Excellent |
| S04 | 86.21 | 57.50 | 0.67 | 37.82 | 35.71 | 0.94 | Functional |
| S05 | 8.40 | 5.00 | 0.60 | 7.10 | 6.15 | 0.87 | Excellent |
| S06 | 98.29 | 98.43 | 1.00 | 55.35 | 55.42 | 1.00 | Not Working |
| S07 | 99.05 | 98.74 | 1.00 | 43.43 | 43.95 | 1.01 | Not Working |
| S08 | 97.66 | 90.26 | 0.92 | 51.62 | 52.29 | 1.01 | Not Working |
| S09 | 87.62 | 88.55 | 1.01 | 7.48 | 6.82 | 0.91 | Not Working |
| S10 | 99.50 | 99.18 | 1.00 | 19.77 | 19.36 | 0.98 | Not Working |
| S11 | 91.87 | 87.81 | 0.96 | 14.67 | 14.35 | 0.98 | Not Working |
| S12 | 98.94 | 93.61 | 0.95 | 45.41 | 45.87 | 1.01 | Not Working |
| S13 | 99.46 | 99.61 | 1.00 | 76.89 | 77.67 | 1.01 | Not Working |
| S14 | 89.00 | 88.00 | 0.99 | 8.87 | 8.63 | 0.97 | Not Working |
| S15 | 1.99 | 0.70 | 0.35 | 10.68 | 1.64 | 0.15 | Excellent |
| S16 | 2.39 | 0.49 | 0.21 | 9.69 | 0.66 | 0.07 | Excellent |
| S17 | 2.48 | 0.43 | 0.17 | 9.15 | 0.53 | 0.06 | Excellent |
| S18 | 30.19 | 4.54 | 0.15 | 25.47 | 21.87 | 0.86 | Excellent |
| S19 | 16.42 | 3.18 | 0.19 | 14.01 | 7.25 | 0.52 | Excellent |
| S20 | 1.91 | 1.01 | 0.53 | 10.32 | 0.96 | 0.09 | Excellent |
| S21 | 37.35 | 36.43 | 0.98 | 15.20 | 9.52 | 0.63 | Good |
| S22 | 99.70 | 98.87 | 0.99 | 56.51 | 56.43 | 1.00 | Not Working |
| S23 | 97.58 | 83.67 | 0.86 | 54.77 | 49.05 | 0.90 | Not Working |
| S24 | 53.02 | 11.18 | 0.21 | 39.14 | 28.48 | 0.73 | Excellent |
| S25 | 6.62 | 2.42 | 0.37 | 18.64 | 2.83 | 0.15 | Excellent |
| S26 | 4.45 | 1.90 | 0.43 | 17.61 | 1.38 | 0.08 | Excellent |
| S27 | 4.46 | 1.98 | 0.44 | 17.13 | 1.34 | 0.08 | Excellent |
| S28 | 51.82 | 9.79 | 0.19 | 39.49 | 29.00 | 0.73 | Excellent |
| S29 | 31.93 | 7.35 | 0.23 | 24.97 | 12.60 | 0.50 | Excellent |
| S30 | 5.52 | 2.85 | 0.52 | 18.27 | 1.44 | 0.08 | Excellent |
| S31 | 65.01 | 61.48 | 0.95 | 27.83 | 16.51 | 0.59 | Functional |

TABLE 1-continued

| | Scattering | | | Visible Reflection | | Sensitivity of proximity sensor |
| --- | --- | --- | --- | --- | --- | --- |
| | Visible | NIR | | | | |
| Sample | (400 nm-700 nm) scattering | (800 nm-1200 nm) scattering | Ratio | SPIN (total) | SPEX (diffuse) | Ratio | covered with sample film |
| S32 | 81.04 | 17.08 | 0.21 | 56.29 | 50.05 | 0.89 | Good |
| S33 | 99.68 | 99.53 | 1.00 | 71.10 | 66.58 | 0.94 | Not Working |

TABLE 2

| | BYK Haze Gard Values (Visible) | | |
| --- | --- | --- | --- |
| Sample | Transmission | Haze | Clarity |
| S01 | 52.00 | 90.00 | 80.00 |
| S02 | 67.70 | 64.90 | 99.40 |
| S03 | 83.10 | 28.70 | 99.20 |
| S04 | 69.50 | 90.70 | 91.60 |
| S05 | 95.90 | 53.50 | 97.50 |
| S06 | 1.06 | 99.50 | 35.60 |
| S07 | 65.60 | 102.00 | 23.00 |
| S08 | 58.20 | 101.00 | 65.20 |
| S09 | 92.50 | 94.50 | 8.80 |
| S10 | 65.80 | 102.00 | 6.20 |
| S11 | 93.60 | 95.70 | 12.10 |
| S12 | 61.60 | 102.00 | 22.40 |
| S13 | 24.20 | 102.00 | 4.60 |
| S14 | 94.00 | 95.40 | 7.00 |
| S15 | 92.20 | 2.13 | 99.60 |
| S16 | 93.30 | 1.61 | 99.60 |
| S17 | 93.60 | 1.03 | 100.00 |
| S18 | 83.40 | 28.80 | 99.30 |
| S19 | 90.20 | 15.00 | 97.50 |
| S20 | 93.40 | 1.89 | 99.60 |
| S21 | 90.30 | 57.10 | 43.90 |
| S22 | 55.30 | 102.00 | 4.70 |
| S23 | 48.40 | 101.00 | 77.60 |
| S24 | 61.50 | 54.80 | 97.80 |
| S25 | 75.70 | 6.60 | 98.70 |
| S26 | 76.40 | 5.14 | 99.00 |
| S27 | 76.80 | 5.17 | 99.00 |
| S28 | 63.20 | 54.50 | 98.20 |
| S29 | 72.20 | 32.10 | 96.30 |
| S30 | 75.70 | 5.35 | 98.60 |
| S31 | 69.90 | 69.40 | 28.90 |
| S32 | 47.60 | 89.70 | 97.70 |
| S33 | 33.80 | 102.00 | 3.90 |
| S34 | 88.70 | 0.24 | 100.00 |

Example 2

Figure 5:
FIG. 5 is a photograph of an example article including an example optical filter and an inked pattern.

FIG. 5 is a photograph of an example article including an example optical filter and an inked pattern. ESR2 is used as a reflective layer. A ULI layer (sample S01 coating) is applied to the reflective layer as the wavelength selective scattering layer. A layer of a latex coating (PrintRite DP 261, Lubrizol) is coated on the ULI layer as combination ink receptor layer and sealant layer, which is 1 mil thick when dry. An ink-jet (solvent ink) printed pattern was printed on top of the ink receptor layer. As shown in FIG. 5, the ink-jet printed pattern is sharp and free of smudges, blurriness, or other defects.

Example 4

Figure 6A:
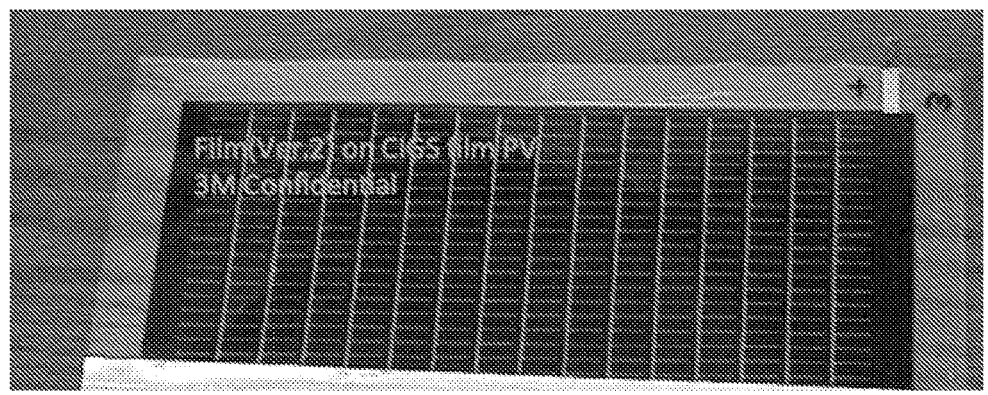
FIG. 6A is a photograph of a solar panel.
Figure 6B:
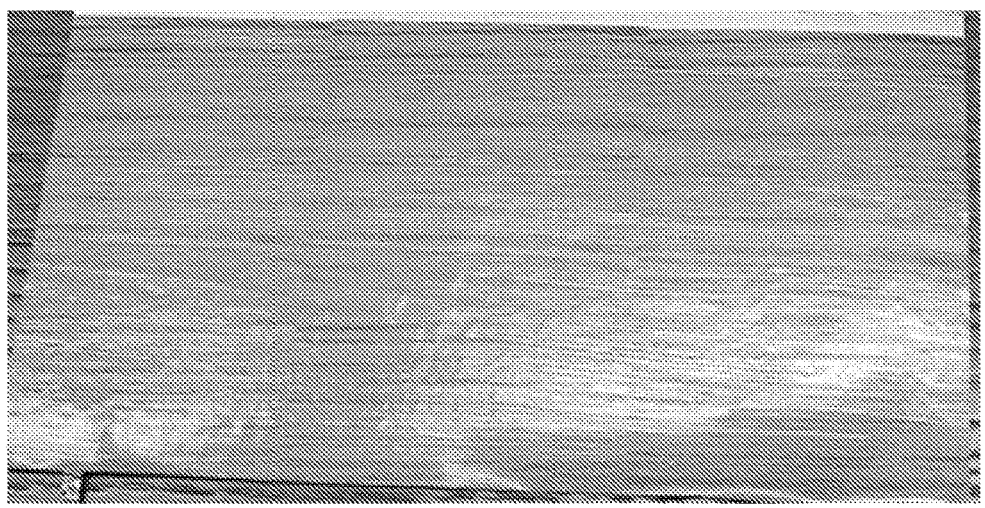
FIG. 6B is a photograph of a solar panel camouflaged by an example optical filter.

FIG. 6A is a photograph of a solar panel. FIG. 6B is a photograph of a solar panel camouflaged by an example optical filter. A multilayer optical filter was formed by depositing a ULI layer (sample S01) on an ESR2 layer. The optical filter was printed with a camouflage pattern (faux wood, similar to the background wood texture). The CIGS (copper indium gallium selenide) film solar panel of FIG. 6A was camouflaged with the example optical filter, as shown in FIG. 6B. The filter was laminated to the solar panel with 3M 8211 Optically Clear adhesive. The camouflaged film panel generated 45% of its original power. The ESR2 film on the back reflected almost all visible light. The power was measured by IV5 solar output test equipment (PV Measurements, Inc., Boudler CO).

Example 5

Figure 7:
FIG. 7 is a photograph of an example article including an example optical filter and an inked pattern.

FIG. 7 is a photograph of an example article including an example optical filter and an inked pattern. The optical filter was formed of an ULI layer deposited on a reflective substrate. The right hand side of the optical filter was coated with a latex coating (PrintRite DP 261, Lubrizol) that formed a transparent film after drying, as an ink receptive layer region. A pattern was inkjet-printed onto the ink-receptive coated region and the uncoated optical filter region. As shown in FIG. 7, the quality of printing on the uncoated region on the left was poorer than in the region coated with the ink-receptive layer on the right. For example, the printed pattern on the uncoated region was fuzzy and striated.

Example 7

Figure 8A:
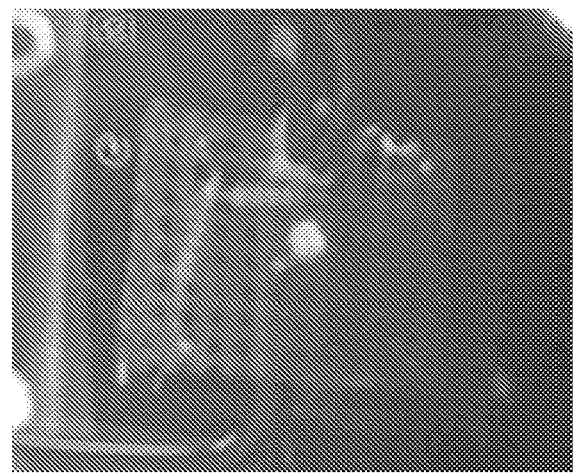
FIGS. 8A-8C are photographs of an example system including an example optical filter and a near-infrared LED.
Figure 8B:
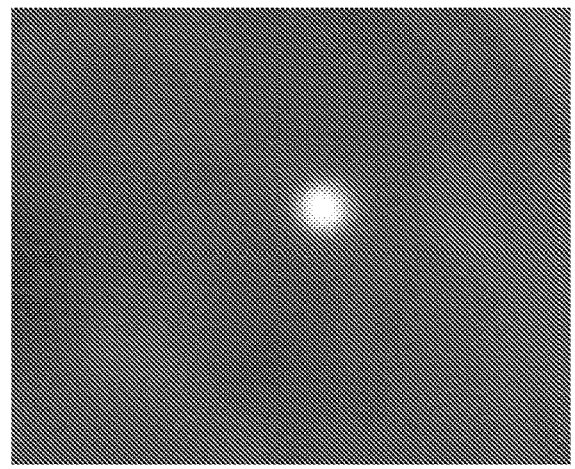
Figure 8C:
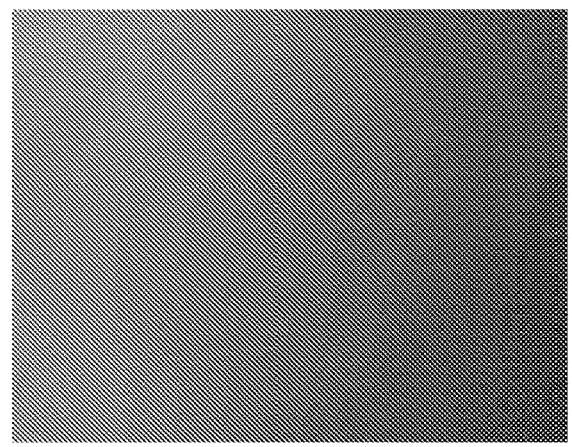

FIG. 8A-8C are photographs of an example system including an example optical filter and a near-infrared LED (similar to the example optical system shown in FIG. 2E). A structure including a near-infrared emitting LED is shown in FIG. 8A. The structure was covered by an example optical filter including a layer of ULI (sample S01) coated on an ESR2 layer. The covered structure was imaged using an infrared camera, resulting in the infrared image shown in FIG. 8B. As shown in FIG. 8B, the image of the LED source is relatively clear, in contrast with the unclear infrared image shown in FIG. 8C. Unlike FIG. 8B, the structure in FIG. 8C (sample S06) was coated with a beaded layer instead of an optical filter including a wavelength selective scattering layer. As shown in FIG. 8C, the unselective beaded layer transmitted the image of the IR LED with very poor clarity.

Example 9

FIG. 9 is an atomic force microscopy (AFM) photograph of a surface of an example optical filter. The optical filter included a surface textured film (sample S05).

Example 10

Figure 10A:
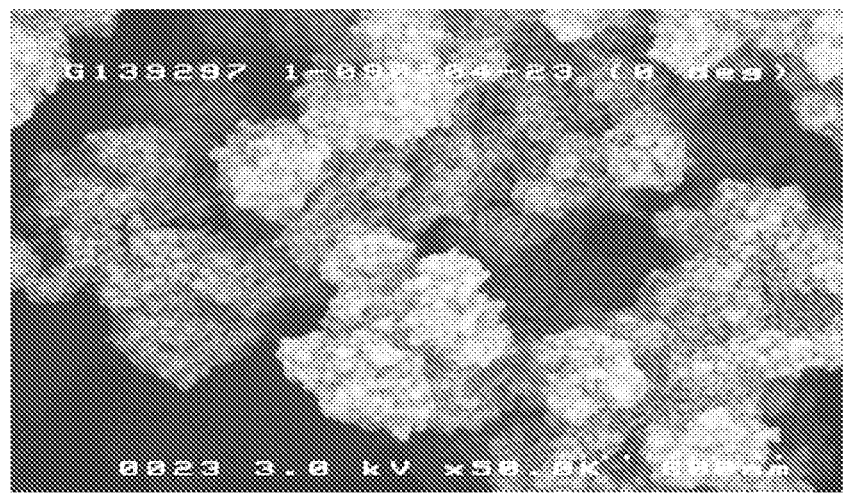
FIGS. 10A and 10B are scanning electron microscopy (SEM) photographs of an example optical filter.
Figure 10B:
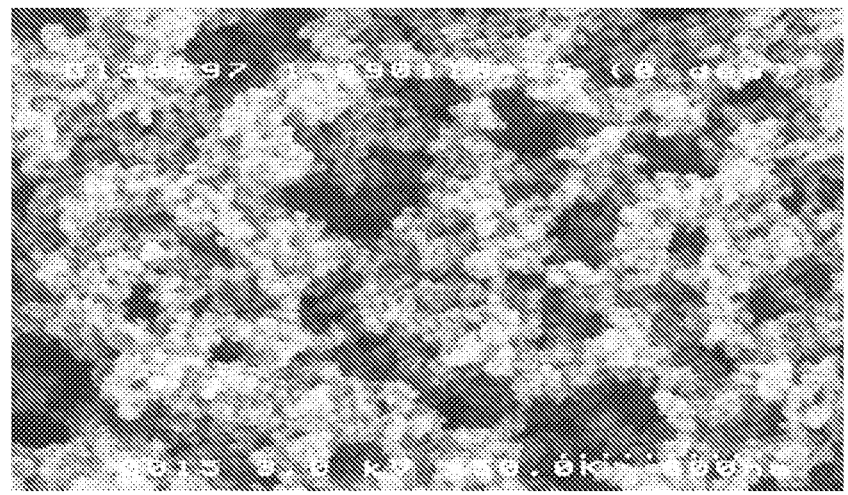

FIGS. 10A and 10B are scanning electron microscopy (SEM) photographs of example optical filters. FIG. 10A shows an optical filter including a high haze low clarity ULI layer (sample S22), while FIG. 10B shows an optical filter including a high haze high clarity ULI layer (sample S02).

Example 11

Figure 11:
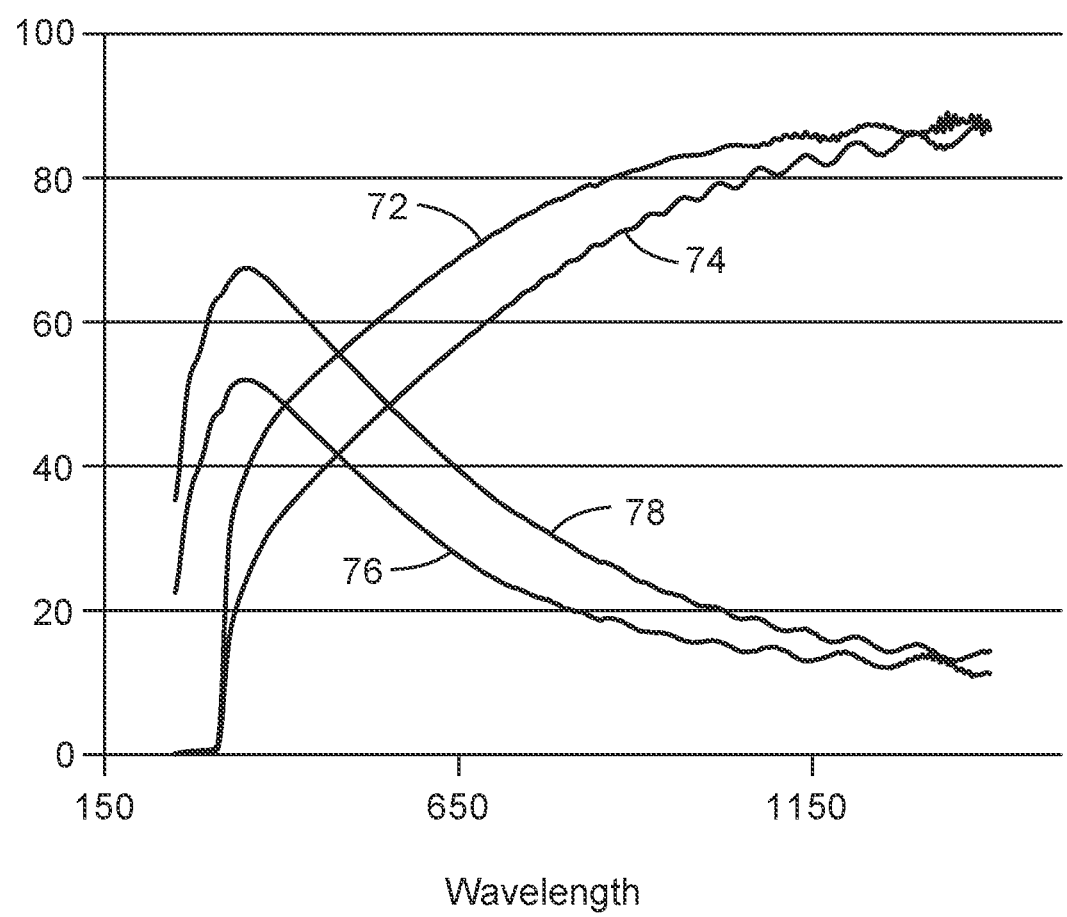
FIG. 11 is a chart presenting % reflectance and % transmittance versus wavelength for example optical filters.

FIG. 11 is a chart presenting % reflectance and % transmittance versus wavelength for example optical filters. Curve 72 represents % transmission of a first sample ULI layer (sample S01). Curve 74 represents % transmittance of a second sample ULI layer (sample S01, but 50% thicker). Curve 76 represents % transmittance of the first sample ULI layer. Curve 78 represents % reflectance of the second sample ULI layer. As shown in FIG. 11, both sample ULI layers selective reflected visible wavelengths, while transmitting near-infrared wavelengths.

Example 12

Figure 12A:
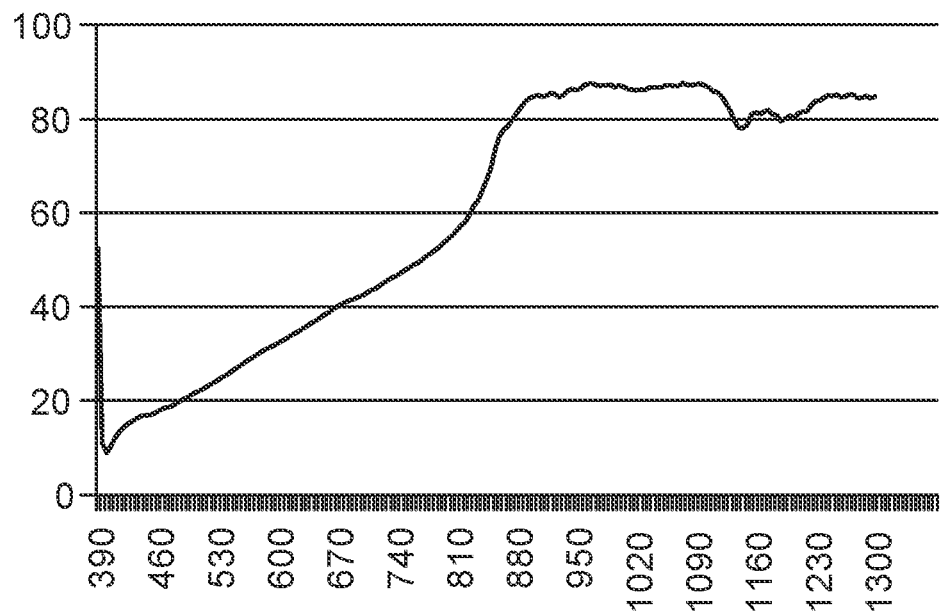
FIGS. 12A and 12B are charts presenting % transmittance versus wavelength for example optical filters.
Figure 12B:
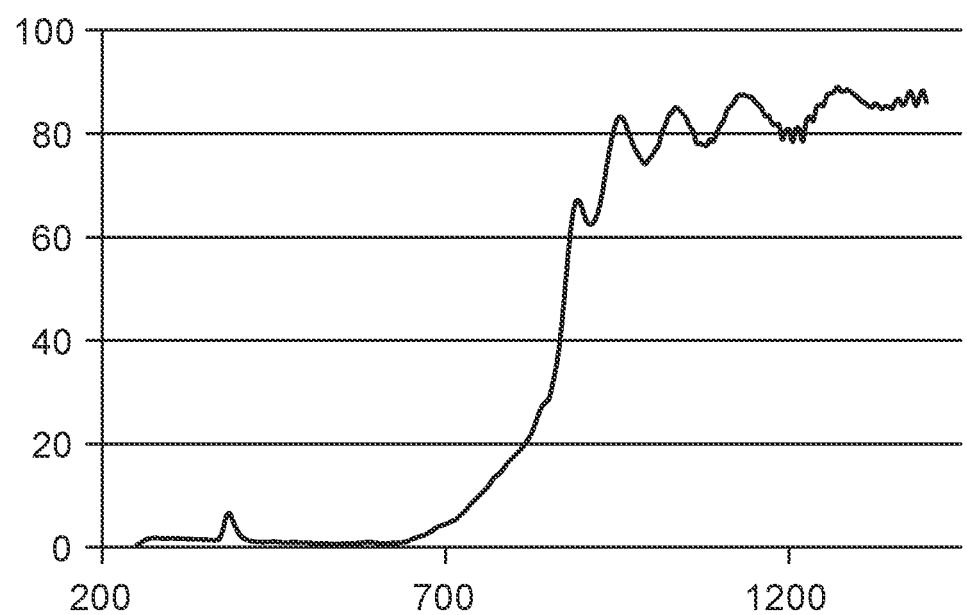

FIGS. 12A and 12B are charts presenting % transmittance versus wavelength for example optical filters. FIG. 12A presents % transmittance for a first sample optical filter including ESR2 coated with beads (sample S06), and limited with PET. FIG. 12B presents transmittance for a second sample optical filter including ESR2 coated with ULI, and laminated with PET. While both sample optical filters transmitted near-infrared wavelengths, as shown in FIGS. 12A and 12B, the ULI-coated ESR selectively blocked the transmission of visible wavelengths compared to the bead-coated ESR, which blocked visible wavelengths to a lower extent.

Example 13

Figure 13:
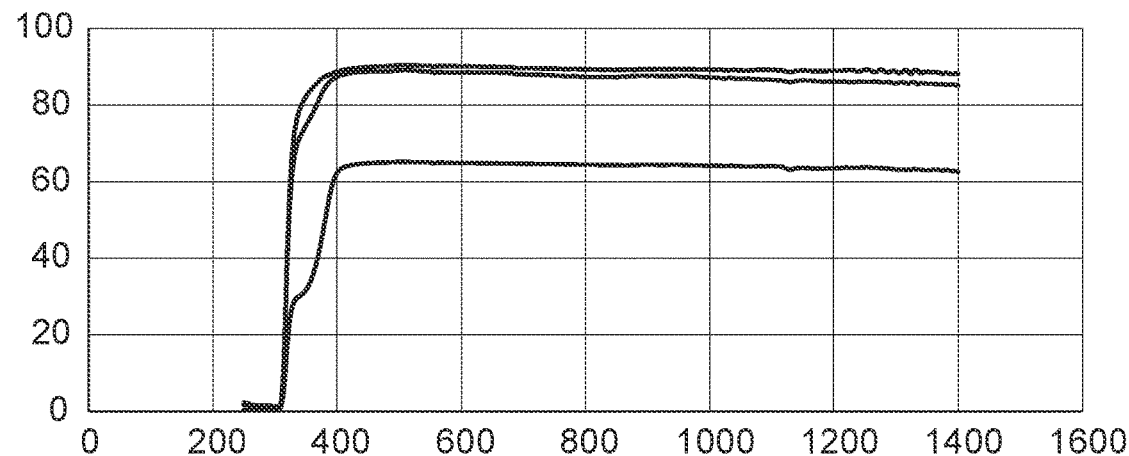
FIG. 13 is a chart presenting % transmittance versus wavelength for example optical filters.

FIG. 13 is a chart presenting % transmittance versus wavelength for sample films. The uppermost curve presents % transmittance for uncoated PET, which can be seen to be relatively flat across the visible and near-infrared regions of the spectrum. The middle curve and the lower curve present % transmittance for a #3 Mayer Bar bead-coated PET layer, and a #10 Mayer Bar bead-coated PET layer respectively. While the bead-coat reduced transmittance, it did not selectively reduce transmittance, and the resulting transmittance curve was also relatively flat across the visible and near-infrared regions of the spectrum. Thus, bead-coated PET did not perform well as wavelength selective scattering layers formed by coating ULI.

Example 14

Figure 14:
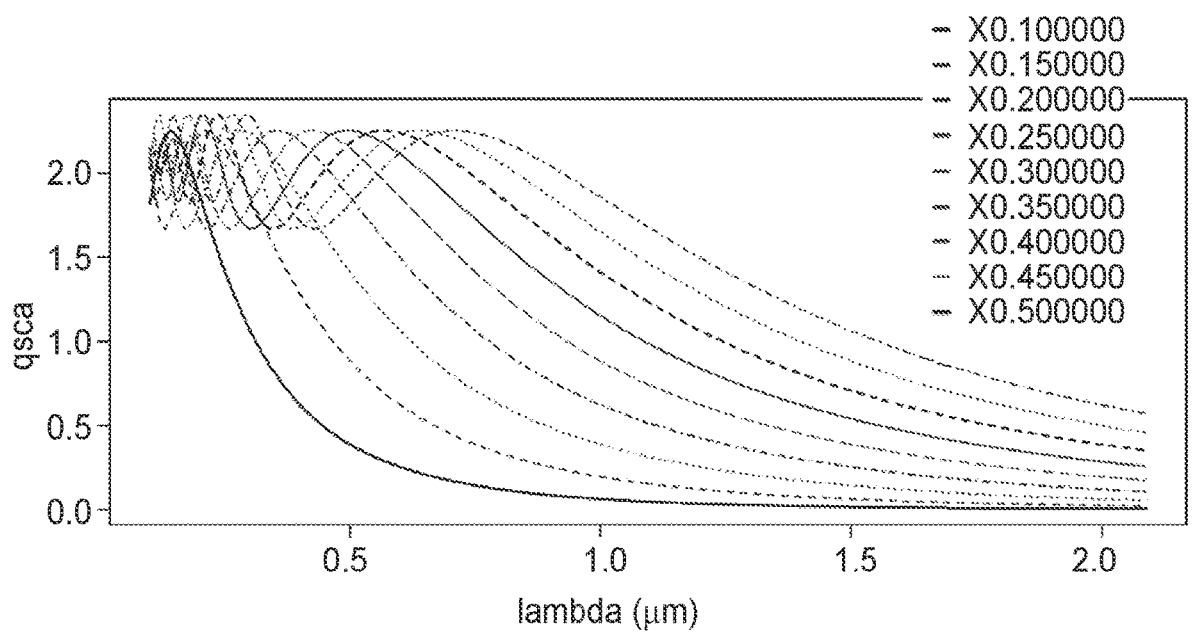
FIG. 14 is a chart presenting results of Mie scattering, showing scattering efficiency versus wavelength for example optical filters.

FIG. 14 is a chart presenting results of Mie scattering, showing scattering efficiency versus wavelength for optical filters including particles of different sizes. For optical filters including particles dispersed in a medium, a model based on Mie scattering was prepared for scattering efficiency as a function of particle size of particles dispersed in the medium and the difference between refractive indices of the medium and the particles. The model was evaluated by setting the refractive index of the medium to 1.5, and that of the scattering particles to 1.0. The particle size was varied from 0.2 µm to 1.0 µm, in steps of 0.1 µm (curves from left to right).

Example 15

Figure 15:
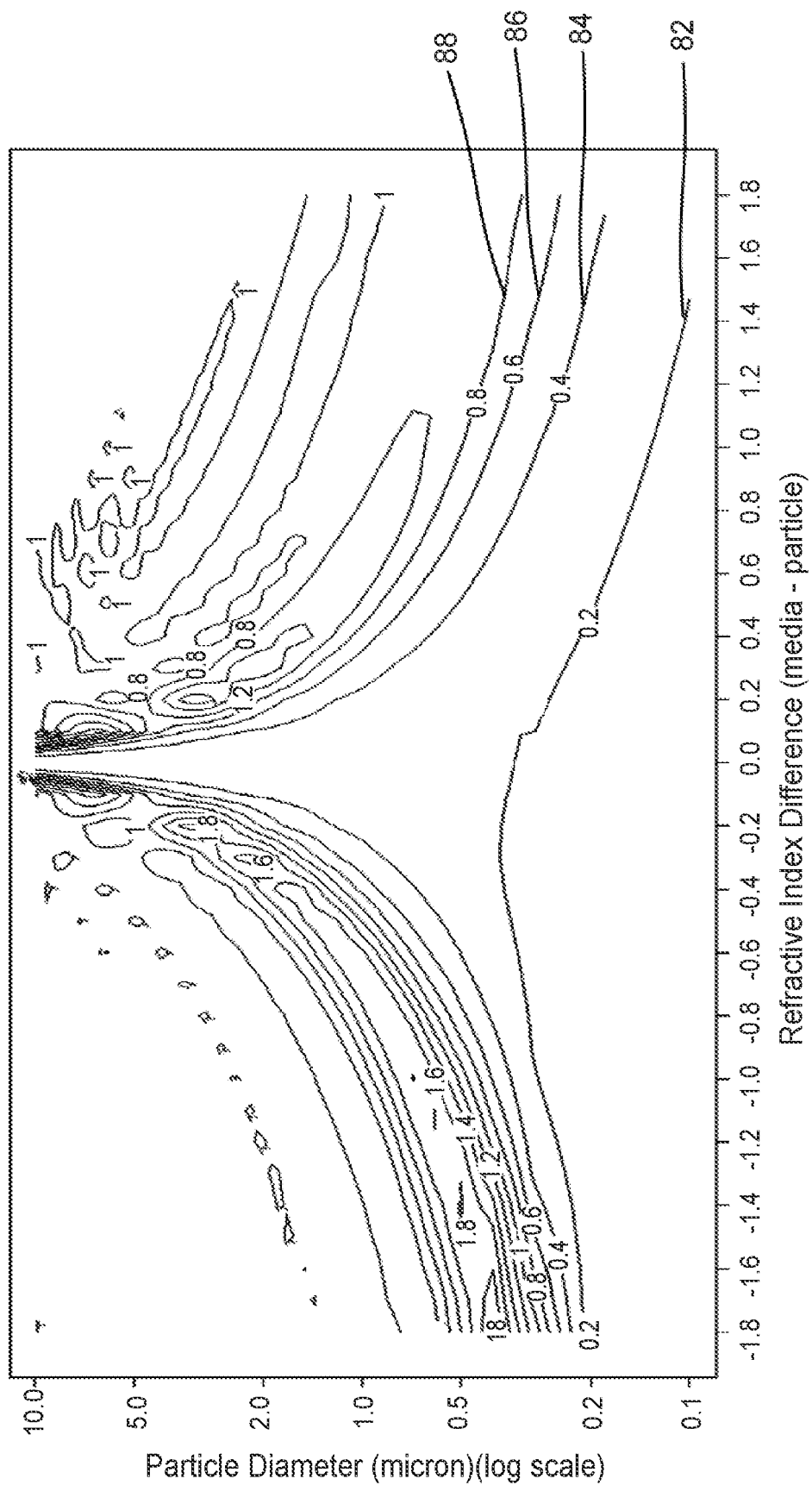
FIG. 15 is a chart presenting near-infrared scattering ratio as a function of particle diameter and refractive index difference for example wavelength selective scattering layers including a medium and a plurality of particles.

FIG. 15 is a chart presenting near-infrared scattering ratio as a function of particle diameter and refractive index difference for optical filters including a medium and a plurality of particles dispersed in the medium. The effect of particle size and the difference between the refractive indices of the medium and the particle on the near-infrared scattering ratio was evaluated using a model, and the results of the model are presented in FIG. 15. The X axis represents difference between refractive indices (media—particle) and the Y axis represents particle diameters (in microns). The contour lines represent different scattering ratios such as 0.2, 0.4, 0.6, 0.8, 1, 1.2, 1.4, 1.6, and 1.8. Thus, curve 82 represents a near-infrared scattering ratio of 0.2. Curve 84 represents a near-infrared scattering ratio of 0.4. Curve 86 represents a near-infrared scattering ratio of 0.6. Curve 88 represents a near-infrared scattering ratio of 0.8.

Example 16

TABLE 3 presents the minimum scattering (transmission) of the diffusive coating that can simulate a hybrid surface (or non-metal) with certain refractive index, on air interface.

TABLE 3

| Hybrid or non-metal surface | | | | |
|---|---|---|---|---|
| RI | R % | Theoretical max SPEX/SPIN | SPIN-SPEX | Diffusive coating T% SPEX/SPIN |
| 1.5 | 4% | 96% | 4% | 80.0% |
| 1.7 | 7% | 93% | 7% | 73.5% |
| 1.8 | 8% | 92% | 8% | 71.7% |
| 2.0 | 10% | 90% | 10% | 68.4% |
| 2.3 | 16% | 84% | 16% | 60.0% |
| 2.4 | 17% | 83% | 17% | 58.8% |
| 2.5 | 18% | 82% | 18% | 57.6% |

The surface is treated as being white. R % is calculated by Fresnel reflection of air to the material with known RI. The theoretical maximum ratio of SPEX/SPIN (diffusive/total visible reflection) was calculated assuming 100% total reflection=Fresnel reflection+diffusive reflection.

Example 17

The diffusive and total reflectance for a number of samples was measured using an X-Rite. The results are presented in TABLE 4.

TABLE 4

| Sample | R % SPIN | R % SPEX | SPEX/SPIN | SPIN – SPEX |
|---|---|---|---|---|
| I-Phone cover white | 68.7 | 67.19 | 0.98 | 1.51 |
| White china plate #1 | 69.29 | 62.38 | 0.90 | 6.91 |
| White china plate #2 | 87.1 | 83.17 | 0.95 | 3.93 |
| White Board | 81.29 | 76.68 | 0.94 | 4.61 |
| Di-Noc white HG-1205 (3M) | 89.73 | 85.65 | 0.95 | 4.08 |
| Di-Noc black HG-1201 (3M) | 4.97 | 0.42 | 0.08 | 4.55 |
| Di-Noc gray HG-1512 (3M) | 11.42 | 6.82 | 0.60 | 4.6 |
| Di-Noc red HG-1511 (3M) | 12.47 | 8.08 | 0.65 | 4.39 |

Various examples of the invention have been described. These and other examples are within the scope of the following claims.

The invention claimed is:
1. A system comprising:
one or both of a light emitter or a light receiver;
a reflective layer, the reflective layer including a multilayer optical film; and
a wavelength selective scattering layer, the wavelength selective scattering layer including a plurality of interconnected voids, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance, wherein light between the wavelength selective scattering layer and one or both of the light emitter and the light receiver follows an indirect path.

2. The system of claim 1, wherein the indirect path includes an optically guided path.

3. The system of claim 1, wherein the indirect path includes a reflective path.

4. The system of claim 1, wherein the indirect path includes refraction.

5. The system of claim 1, wherein the indirect path includes filtering.

6. The system of claim 1, wherein the indirect path travels through an optical media.

7. The system of claim 1, wherein the wavelength selective scattering layer transmits less than about 50% of incident visible light and transmits greater than about 50% of incident near-infrared light.

8. The system of claim 1, wherein the wavelength selective scattering layer combined with the reflective layer has a transmittance for at least one wavelength in the visible spectrum of less than 10% and a transmittance for at least one wavelength in the near-infrared spectrum of above 60%.

9. A system comprising:
one or both of a light emitter or a light receiver;
a reflective layer, the reflective layer including a multilayer optical film; and
a wavelength selective scattering layer, the wavelength selective scattering layer including a plurality of interconnected voids, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance, wherein a periphery of the wavelength selective scattering layer extends beyond a periphery of one or both the light emitter and the light receiver.

10. The system of claim 9, wherein an area of a major surface of the wavelength selective scattering layer is greater than a surface area of one or both of the light emitter and the light receiver.

11. The system of claim 9, wherein the wavelength selective scattering layer transmits less than about 50% of incident visible light and transmits greater than about 50% of incident near-infrared light.

12. The system of claim 9, wherein the wavelength selective scattering layer combined with the reflective layer has a transmittance for at least one wavelength in the visible spectrum of less than 10% and a transmittance for at least one wavelength in the near-infrared spectrum of above 60%.

13. A system comprising:
one or both of a light emitter or a light receiver;
a reflective layer, the reflective layer including a multilayer optical film; and
a wavelength selective scattering layer, the wavelength selective scattering layer including a plurality of interconnected voids, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance, wherein the reflective layer is disposed between the wavelength selective scattering layer and one or both of the light emitter and the light receiver.

14. The system of claim 13, wherein the reflective layer is disposed between the wavelength selective scattering layer and the light emitter.

15. The system of claim 13, wherein the reflective layer is disposed between the wavelength selective scattering layer and the light receiver.

16. The system of claim 13, wherein the wavelength selective scattering layer transmits less than about 50% of incident visible light and transmits greater than about 50% of incident near-infrared light.

17. The system of claim 13, wherein the wavelength selective scattering layer combined with the reflective layer has a transmittance for at least one wavelength in the visible spectrum of less than 10% and a transmittance for at least one wavelength in the near-infrared spectrum of above 60%.

* * * * *